US008155255B2

(12) United States Patent
Chen et al.

(10) Patent No.: US 8,155,255 B2
(45) Date of Patent: Apr. 10, 2012

(54) METHOD FOR ESTIMATION OF SIGNAL FREQUENCY AND DISPLACEMENT ESTIMATION METHOD AND DEVICE WITH CONSISTENCY CHECK, PERIOD PREDICTION AND COMPENSATION, AND/OR ADAPTIVE THRESHOLD UPDATE

(75) Inventors: Hsin Chia Chen, HsinChu (TW); Tzu Yi Chao, HsinChu (TW); Chun Huang Lin, HsinChun (TW); Jeng Feng Lan, HsinChu (TW); Yi Fang Lee, HsinChu (TW)

(73) Assignee: Pixart Imaging Corporation, Hsin-Chu (TW)

( * ) Notice: Subject to any disclaimer, the term of this patent is extended or adjusted under 35 U.S.C. 154(b) by 1473 days.

(21) Appl. No.: 11/699,738

(22) Filed: Jan. 29, 2007

(65) Prior Publication Data

US 2007/0297545 A1   Dec. 27, 2007

(30) Foreign Application Priority Data

Jun. 23, 2006   (TW) ................................ 95122851 A

(51) Int. Cl.
*H04B 1/10* (2006.01)

(52) U.S. Cl. ........................ 375/350; 348/162; 375/346
(58) Field of Classification Search ................. 375/346, 375/350; 348/162
See application file for complete search history.

(56) References Cited

U.S. PATENT DOCUMENTS

| 5,367,153 | A | * | 11/1994 | Suda et al. | 250/201.8 |
| 5,737,239 | A | * | 4/1998 | Horiuchi et al. | 702/56 |
| 5,973,752 | A | * | 10/1999 | Matsunaga | 348/614 |
| 7,501,811 | B2 | * | 3/2009 | Ono | 324/207.25 |

* cited by examiner

*Primary Examiner* — Mohamed Wasel
(74) *Attorney, Agent, or Firm* — Tung & Associates

(57) ABSTRACT

A displacement estimation method is disclosed which includes: a signal capturing step for capturing a signal; a displacement estimation step for calculating a displacement based on a state change of the signal; and an output step for outputting the displacement, in which the displacement estimation step includes one or more of the steps of (A) consistency check to determine whether the state change of the signal is consistent with the waveform of the signal; (B) period prediction and compensation to count in the present period according to a proportional length of a previous period; and (C) adaptive threshold update to adjust the definition of the state change corresponding to the amplitude of the signal.

20 Claims, 15 Drawing Sheets

METHOD FOR ESTIMATION OF SIGNAL FREQUENCY AND DISPLACEMENT ESTIMATION METHOD AND DEVICE WITH CONSISTENCY CHECK, PERIOD PREDICTION AND COMPENSATION, AND/OR ADAPTIVE THRESHOLD UPDATE

BACKGROUND OF THE INVENTION

1. Field of the Invention

The present invention relates to a method employing bumping algorithm for estimation of signal frequency, and relates also to a displacement estimation device and a method for the same.

2. Description of the Related Art

As background, the conventional bumping algorithm will first be explained referring to FIG. 1. As shown in the figure, from the perspective of bumping algorithm, a one-dimensional sinusoidal signal includes two states: 0 and 1; and the transition point between these two states is dependent on the bumping threshold. The term "bumping threshold" is a predetermined magnitude counted from a peak downward, or a predetermined magnitude counted from a valley upward. Referring to the figure, although the middle point of the amplitude is at the point A, in order to filter noises so that the signal state will not change due to minor vibrations, the transition point for the signal to change from 1 to 0 is set at the point A1, while the transition point for the signal to change from 0 to 1 is set at the point A2. That is, when the signal passes through a peak, the signal state does not change until the signal further goes through the predetermined magnitude d to reach a point lower than A1, and only after this point it is determined that the signal state changes from 1 to 0; likewise, when the signal passes through a valley, the signal state does not change until the signal further goes through the predetermined magnitude d to reach a point higher than A2, and only after this point it is determined that the signal state changes from 0 to 1.

The bumping algorithm may be applied to, for example, the following application. If one observes a speckle signal on an object from an observation window at a fixed location, the frequency of the signal varies in accordance with the relative movement speed between the surface of the object and the surface of the window. The higher the relative speed is, the higher the frequency of the speckle signal will be; the lower the relative speed is, the lower the frequency of the speckle signal will be. Thus, by sensing the frequency of the speckle signal with a proper optical device, the relative speed may be obtained. The above mentioned bumping algorithm may be used to convert an analog signal to a digital signal, so that the calculation of the relative speed may be easier. Furthermore, by providing two optical signal receivers at two nearby locations along an one-dimensional axis, referring to as the first channel and the second channel, the phase difference between the signals received by the two channels may be used to determine the movement direction of the object in the dimension.

Referring to FIG. 2 in which the horizontal coordinate is time and the vertical coordinate is the received light intensity, and (x1, x2) represents the digital states of the signals received by the first and second channels, as converted by means of the bumping algorithm, it may be seen that (x1, x2) changes from (1,1) to (1,0), and then to (0,0). This shows that the second channel is leading, which means that the object under observation is moving from the second channel (the second optical receiver) to the first channel (the first optical receiver). The movement speed of the object may be calculated by the frequency of the signal state changes.

FIG. 3 shows a conventional device structure for estimating displacement by means of the bumping algorithm. The device includes a signal capturing unit 11 which captures a signal and sends it to a bumping-count displacement estimation unit 15. The bumping-count displacement estimation unit 15 estimates the displacement according to the phase difference between the received signals, and the frequency of the signal state changes (i.e., the bumping count). The estimated displacement is outputted by an estimated displacement output unit 19.

The above mentioned conventional device has a drawback in that, the detected signal intensity and phase may vary due to intensity variation of external light source, noise, and error of the optical device components and the signal may even disappear for a short while. Therefore, to estimate the displacement more precisely, a more sophisticated device is required.

SUMMARY OF THE INVENTION

In view of the foregoing, it is an object of the present invention to provide a method employing an improved bumping algorithm which includes any or a combination of two or more of: consistency check step, period prediction and compensation step, or adaptive threshold update step.

Another object of the present invention is to provide a displacement estimation method based on the above mentioned improved bumping algorithm, which achieves more accurate displacement estimation by adding a step of filtering and enhancing the signals or a step of correcting unreasonable displacement calculation result.

A further object of the present invention is to provide a displacement estimation device based on the above mentioned improved bumping algorithm and displacement estimation method. The device may be used in any apparatus that requires displacement estimation, including but not limited to: mouse, navigation device, speeding detection device, etc.

To achieve the foregoing and other objects, according to an embodiment of the present invention, a method for estimation of signal frequency based on bumping algorithm comprises: receiving a signal; determining an amplitude value as a bumping threshold; counting the number of state changes, wherein a state change occurs when the signal reaches the bumping threshold from a peak, or from a valley; characterized by further comprising one or more of the steps of: (A) consistency check to determine whether the state change of the signal is consistent with the waveform of the signal; (B) period prediction and compensation to count in the present period according to a proportional length of a previous period; and (C) adaptive threshold update to adjust the definition of the state change corresponding to the amplitude of the signal.

In addition, according to another embodiment of the present invention, a displacement estimation method comprises: a signal capturing step for capturing a signal; a displacement estimation step for calculating a displacement based on a state change of the signal; and an output step for outputting the displacement, wherein the displacement estimation step includes one or more of the steps of: (A) consistency check to determine whether the state change of the signal is consistent with the waveform of the signal; (B) period prediction and compensation to count in the present period according to a proportional length of a previous period; and (C) adaptive threshold update to adjust the definition of the state change corresponding to the amplitude of the signal.

In the above embodiment, a signal enhancement step to enhance the signal by filtering may be added after the signal capturing step. According to another embodiment of the present invention, an error displacement correction step may be added before the output step to correct the estimation result from the displacement estimation step.

In addition, according to a further other embodiment of the present invention, a displacement estimation device comprises: a signal capturing unit for capturing a signal external to said device; a displacement estimation unit electrically connected with said signal capturing unit, wherein said displacement estimation unit calculates a displacement based on a state change of said signal captured by said signal capturing unit; and a displacement output unit for outputting said displacement, wherein said displacement estimation unit performs one or more of the steps of: (A) consistency check to determine whether said state change of said signal is consistent with the waveform of said signal; (B) period prediction and compensation to count in the present period according to a proportional length of a previous period; and (C) adaptive threshold update to adjust the definition of said state change corresponding to the amplitude of said signal.

In the above embodiment, a signal enhancement unit to enhance the signal by filtering may be added between the signal capturing unit and the displacement estimation unit. According to another embodiment of the present invention, an error displacement correction unit may be added between the displacement estimation unit and the displacement output unit to correct the estimation result from the displacement estimation unit.

For better understanding the objects, characteristics, and effects of the present invention, the present invention will be described below in detail by illustrative embodiments with reference to the attached drawings.

DESCRIPTION OF THE PREFERRED EMBODIMENT

The present invention relates to a method employing bumping algorithm for estimation of signal frequency, and relates also to a displacement estimation method and device employing the bumping algorithm. The displacement estimation method and device may be applied to an indexing apparatus such as an optical mouse, or other apparatuses that require tracking of locations or variations of images, such as a navigation device, a speeding detection device, etc. For convenience in illustrating the spirit of the present invention, in the following context, optical mouse is shown as the primary embodiment according to the present invention, but it should be understood that the application of the present invention is not limited to optical mouse.

Figure 1:
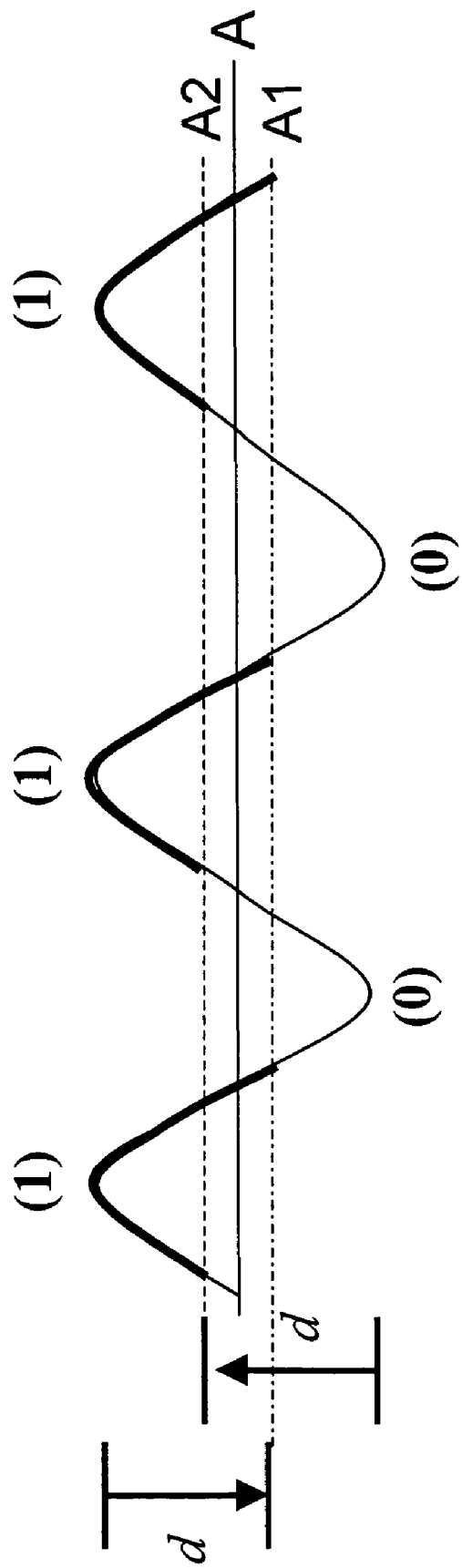
FIG. 1 explains the conventional bumping algorithm.
Figure 2:
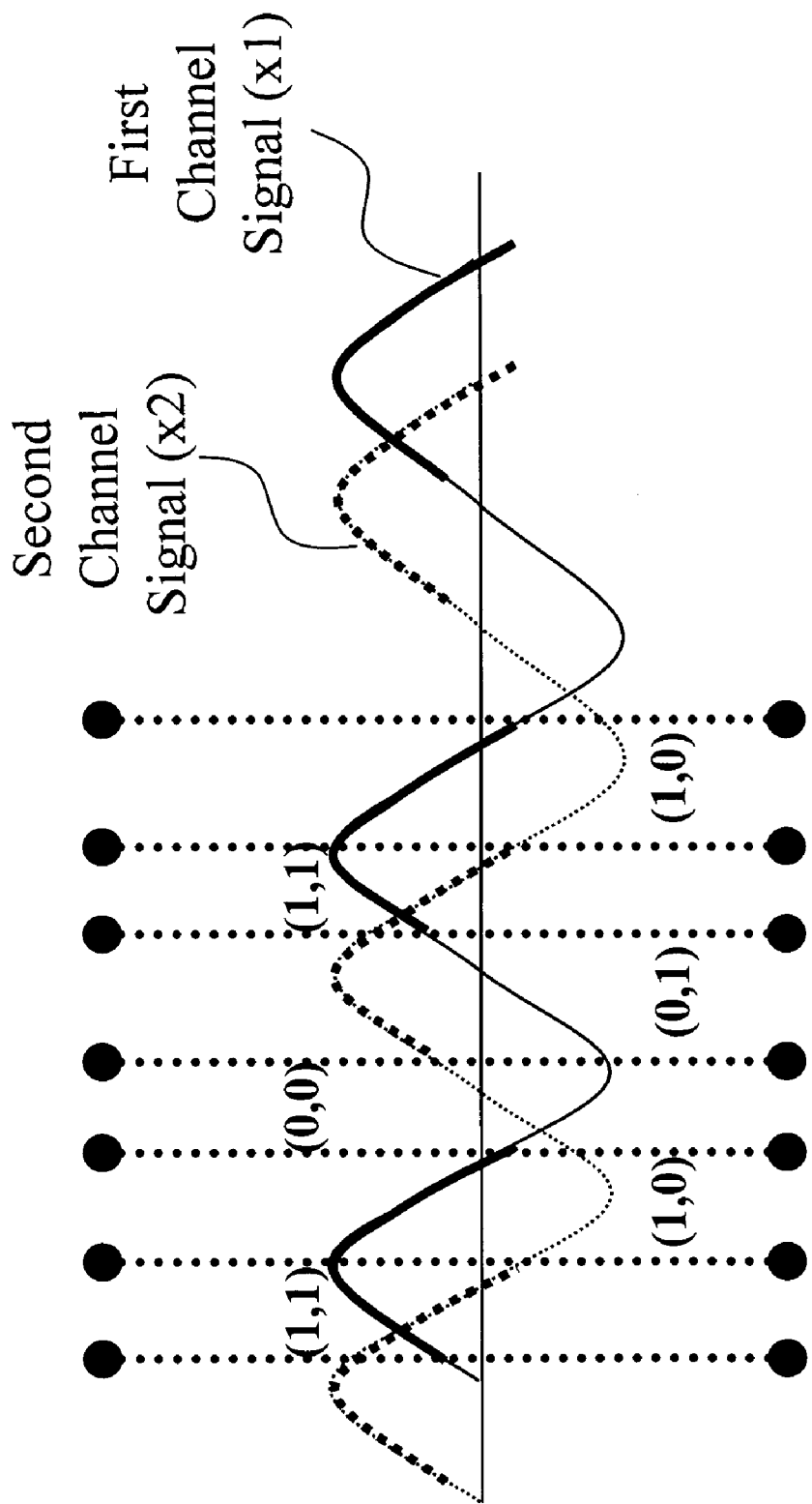
FIG. 2 explains how to determine a moving direction according the phase difference between two channels.
Figure 3:
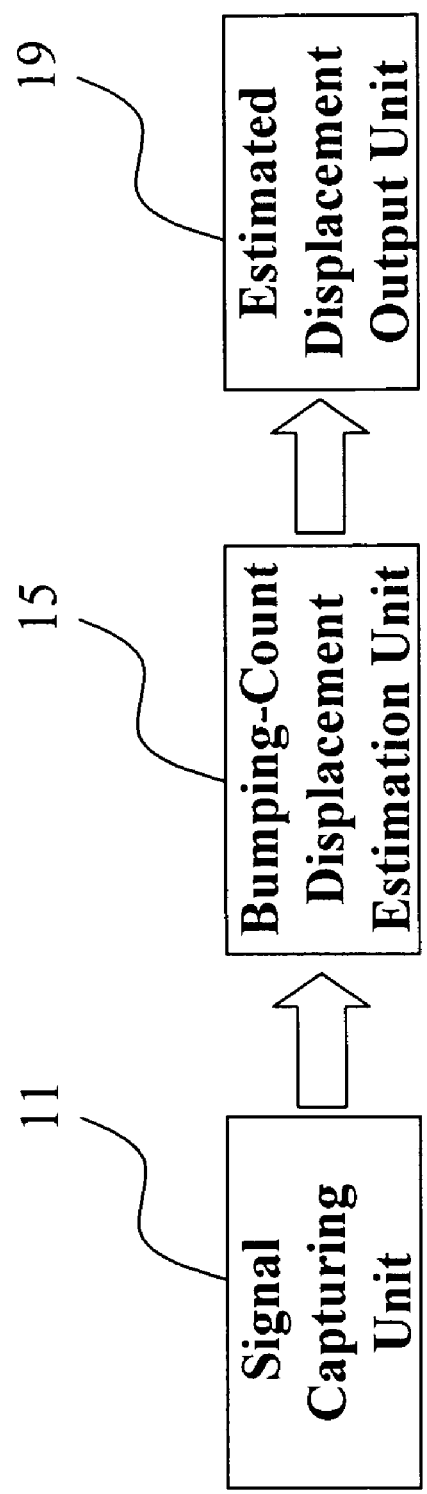
FIG. 3 schematically shows a conventional displacement estimation device employing bumping algorithm.
Figure 4:
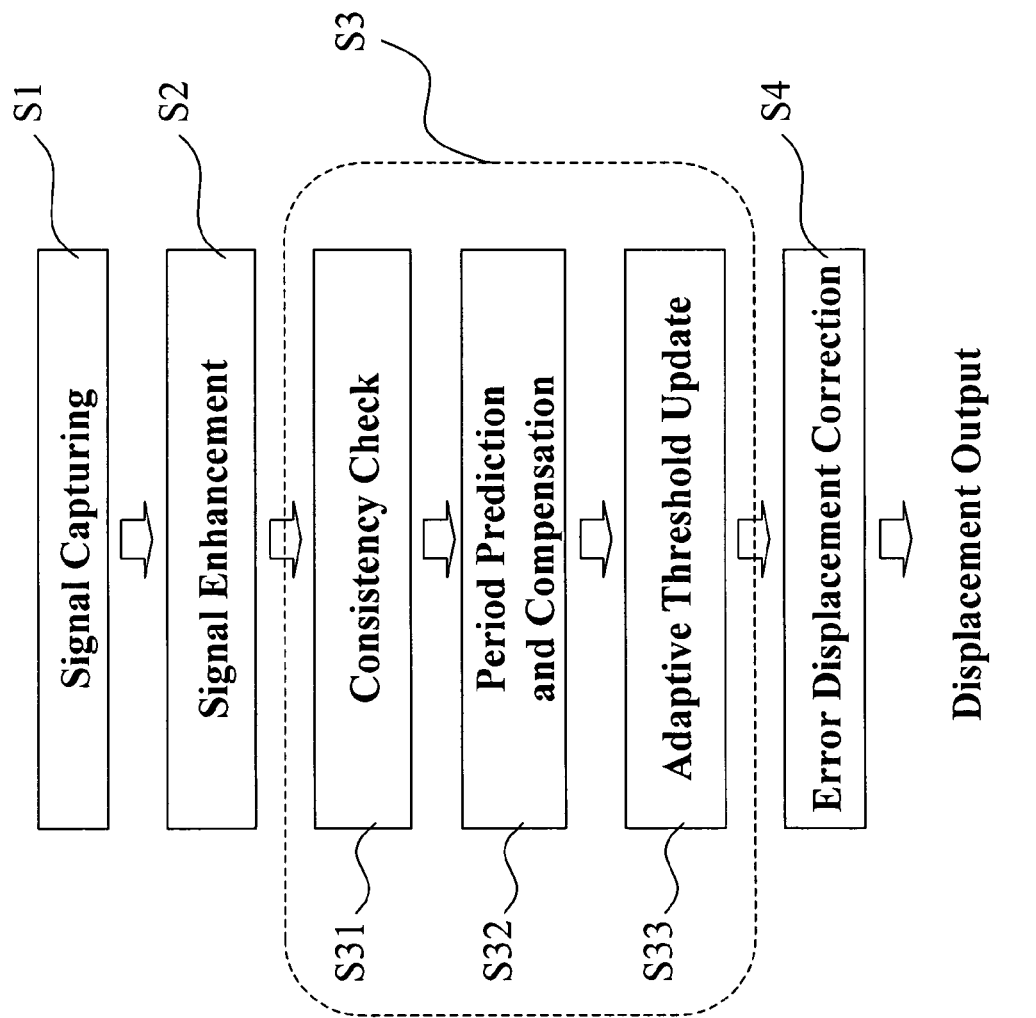
FIG. 4 shows an embodiment of the bumping algorithm and the displacement estimation method according to the present invention.

Please refer to FIG. 4 which shows the basic concept according to the present invention. First, after a signal is captured at the step S1, the signal is subject to a signal enhancement step S2 wherein the noises in the signal are filtered by band-pass filtering or adaptive filtering. Next in the step S3, a calculation based on bumping algorithm is performed on the filtered signal; in this step S3, the calculation is based not only on the basic bumping algorithm, but also includes more sophisticated steps: the consistency check step S31, the period prediction and compensation step 32, and the adaptive threshold update step S33. The "consistency check" is to verify whether the state changes in each channel is consistent with the bumping process; the "period prediction and compensation" is to predict and compensate a long period according to previous short period(s), when there is no state change detected in the long period; the "adaptive threshold update" is to adjust the bumping threshold according to the amplitude of the signal. Last, after a displacement is estimated according to previous steps, an error displacement correction step S4 is performed to correct the final result, so that noises or errors due to known or unknown reasons may be filtered.

Before further explaining the details of the foregoing steps, it should be emphasized that, although it is most preferred that all of the foregoing steps are included to embody the present invention, not all of the steps are not necessary, in the most basic concept of the present invention. For example, either or both of the step S2 and S3 may be omitted; as another example, it requires only one of the steps S31-S33 to provide an estimation result better than prior art.

I. Signal Enhancement

The purpose of the signal enhancement step S2 is to filter noises from the signal, so that the signal may be more accurate. Band-pass filtering may be used to filter high-frequency or low-frequency noises, or, adaptive filtering may be used to adaptively enhance the signal.

As a more detailed example, one may use a band-pass filter with a system function in z-domain as below:

$$HP(z) = f\left(\frac{1-z^{-1}}{1-(1-\beta)z^{-1}}\right)$$

$$LP_1(z) = f\left(\frac{\beta z^{-1}}{1-(1-\beta)z^{-1}}\right)$$

$$LP_2(z) = f\left(\frac{1}{4} + \frac{1}{2}z^{-1} + \frac{1}{4}z^{-2}\right)$$

in which f(x) may be, e.g., x; $x^2$; $x^3$ ...
and in which β is a dominant coefficient which may be used to control the cut-off frequency of the high-pass filter HP(z) or the low-pass filter $LP_1(z)$.

Where adaptive filtering is used, an adaptive filter may be built by the Least-Mean-Square (LMS) method, as below:

$$\hat{u}(n+\Delta) = \hat{w}^T(n)u(n)u(n) = [u(n), u(n-1), \ldots, u(n-M+1)]^T$$

in which $$\hat{w}(n) = [\hat{w}_0(n), \hat{w}_1(n), \ldots, \hat{w}_{M-1}(n)]^T$$

$$\hat{w}(n+1) = \hat{w}(n) + \mu[u(n+\Delta) - \hat{u}(n+\Delta)u](n)$$

and in which $\hat{u}(n+\Delta)$ is the filtered signal at the time point $(n+\Delta)$; $\hat{w}(n)$ and $\hat{w}(n+1)$ are, respectively, the filter coefficients at the time points n and n+1; u(n), u(n−1), and u(n+Δ) are, respectively, the signal value at the time points n, n−1, and n+Δ; u(n) is an M×1 matrix including the signal value u(n) from the time point n ..., to the signal value u(n−M+1) from the time point (n−M+1); μ is a ratio (0≦μ≦1); and [ ]$^T$ is a symbol for transposition.

Or, an adaptive filter may be built by the normalized Least-Mean-Square (normalized LMS) method, as below:

$$\hat{u}(n+\Delta) = \hat{w}^T(n)u(n)$$

$$u(n) = [u(n), u(n-1), \ldots, u(n-M+1)]^T$$

in which $$\hat{w}(n) = [\hat{w}_0(n), \hat{w}_1(n), \ldots, \hat{w}_{M-1}(n)]^T$$

$$\hat{W}(n+1) = \hat{W}(n) + \mu[u(n+\Delta) - \hat{u}(u+\Delta)]\frac{u(n)}{a+\|u(n)\|^2}$$

and in which a is a constant, etc.

In addition to the above mentioned filtering methods, other filtering methods may be used such as the Kalman adaptive filtering, etc. The choice of the filtering method depends on the application of the device; the key point is to select meaningful portion(s) in the signal to be subject to following calculation based on bumping algorithm.

II. Consistency Check

Figure 5:
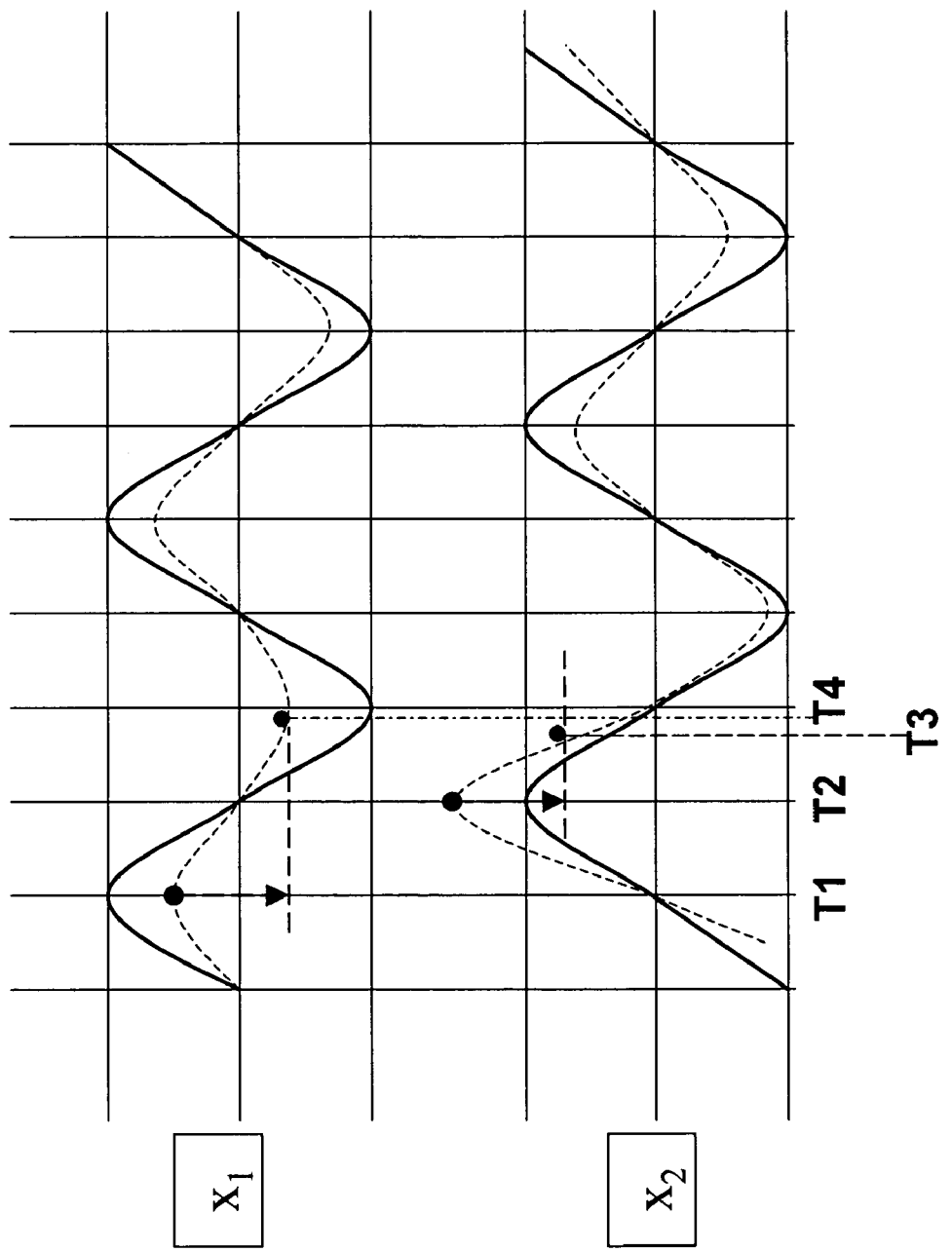
FIG. 5 explains how the variation of the amplitude affects the bumping threshold, and how the present invention performs consistency check.

Please refer to FIG. 5, which is an example for explaining the significance and process for consistency check. The upper part of the figure shows the signal captured by the first channel, and the lower part of the figure shows the signal captured by the second channel (of course, these signals may have been subject to the filtering step S2). Referring to the figure, the actual intensity of the signals are as shown by the solid lines, but due to a certain reason the amplitudes of the signals are distorted that the amplitude of the first channel signal is shrunk while the amplitude of the second channel signal is enlarged, so that the received signals that will be subject to calculation are as shown by the dash lines. Thus, although it can be seen from the periods of the two signals and the phase difference between the two signals that the first channel signal leads by 90°, the bumping algorithm calculation based on the dash lines will not reach the same result. As a matter of fact, the phase difference between the two signals is not 90°, and furthermore, it is even worse at the time point T3, when the second channel passes through the bumping threshold and changes state from 1 to 0, leading the state change of the first channel signal. Apparently this will lead to significant errors in displacement estimation, and even misjudgment of moving direction.

Hence, according to the present invention, a consistency check step is provided to prevent from such possible errors. The step includes the sub-steps of: first recording the peak or valley time points of the two channels; and at the time when a channel is in the lead to change state, checking whether the previous peak or valley of the same channel has lead the other channel. Referring to FIG. 5, first at the time points T1 and T2, the peak time points of the two channels are recorded, respectively. Next at the time point T3, the second channel signal is in the lead to change state from 1 to 0, and thus the previous peak time points should be compared (if the state change is from 0 to 1, then the previous valley time points should be compared). During the comparison, it is found that the peak of the first channel signal leads the peak of the second channel signal, which is not consistent with the state change. Thus, the state change does not pass through the consistency check, and it is determined to be an error.

When a state change does not pass through the consistency check, there are many possible follow-up actions to be taken. For example, one may simply neglect the error, or estimate the time point of the current state change by extrapolation according to the state changes of several previous periods, etc. The physical meaning of such actions are: stopping generating displacement output, or determining the displacement amount according to previous displacement speed, etc.

III. Period Prediction and Compensation

Figure 6:
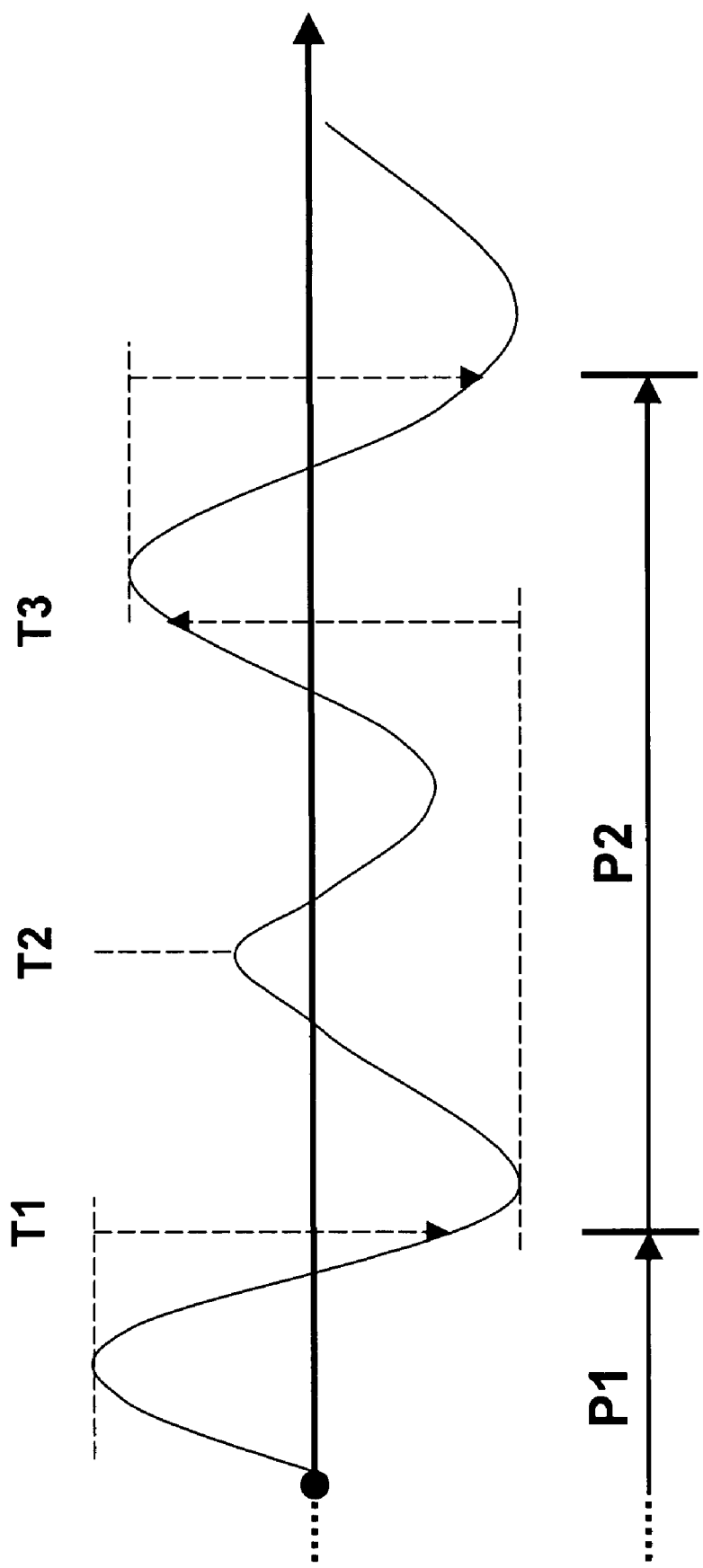
FIG. 6 explains why the period prediction and compensation is required.

Please refer to FIG. 6, which shows a signal waveform received by a channel. As shown in the figure, the signal reaches the bumping threshold and changes state from 1 to 0 at the time point T1, but does not change state at the peak time point T2 because it does not reach the bumping threshold. Only until the time point T3 that its state changes from 0 to 1. In other words, there is a long period P2 after the initial short period P1.

The reason for such long period to occur may be due to signal attenuation that no signal reaches the threshold. If there is no displacement output in a long period until the next state change, in displacement estimation, this means that there is no movement for a long time and next there is a big jump. If the displacement estimation device is used in a mouse, it results in a cursor movement as thus: the mouse is continuously moving but the cursor stays still for a while, and next jumps to a far-away position. This is obviously not preferred. Hence, it is desired to provide compensation to counter such error caused by signal attenuation.

According to the present invention, the solution is to provide a period prediction and compensation step for the present displacement output, based on a previous period. The step includes the sub-steps of: proportionally projecting the length of the previous period in the present period; calculating a count of the proportionally projected length in the present period; and using the count as a basis for displacement estimation before the next state change. The physical meaning of this is: if the present period is longer than the previous period, the device keeps outputting the displacement behavior of the previous period until the next state change, and at the state change it supplements the difference between the "predictive compensation" and the "actual displacement". In one embodiment, the mathematical formula for this may be:

$$\text{Count}=\text{Count}_{prev}+\text{int}[(\text{Period2/Period1})/\text{Ratio}]+1$$

wherein Count is the state change count thus far, the displacement amount being a function of and may be obtained from the count; $\text{Count}_{prev}$ is the previous count; int[ ] is to take the integer part of the number in the bracket; Period1 is the length of the previous period; Period2 is the length of the present period thus far; Ratio is a ratio number arbitrarily given by a designer, which maybe, e.g., 1.0, 1.2, . . . .

The physical meaning of the mathematical formula is thus: by counting every once, the present period has passed through a time length that is equal to the whole length of the previous period (if Ratio is 1) or a multiple/proportion of the previous period (if Ratio is another value). Every time the number of count changes, the displacement estimation device outputs the same (or a multiple/proportion of) displacement behavior (moving direction and amount) according to what it did in the previous period.

To prevent from keeping outputting displacement amounts in a period when there is indeed no actual displacement (for example, when a mouse is still), according to the present invention, preferably an upper limit is given:

$$\text{Count} \leq \text{Count\_max}$$

That is, when the number Count exceeds an upper limit Count_max, the device stops performing period prediction and compensation. The number of Count_max may be, e.g., 6.

IV. Adaptive Threshold Update

As seen from the previous FIG. 5, if the bumping threshold is set to be a fixed value, when the amplitude of a signal is changed, the signal may reach the threshold earlier or later than expected, to cause an error. Therefore, it is preferred that the bumping threshold be set corresponding to the amplitude of the signal, and this is the "adaptive threshold update" according to the present invention.

Figure 7:
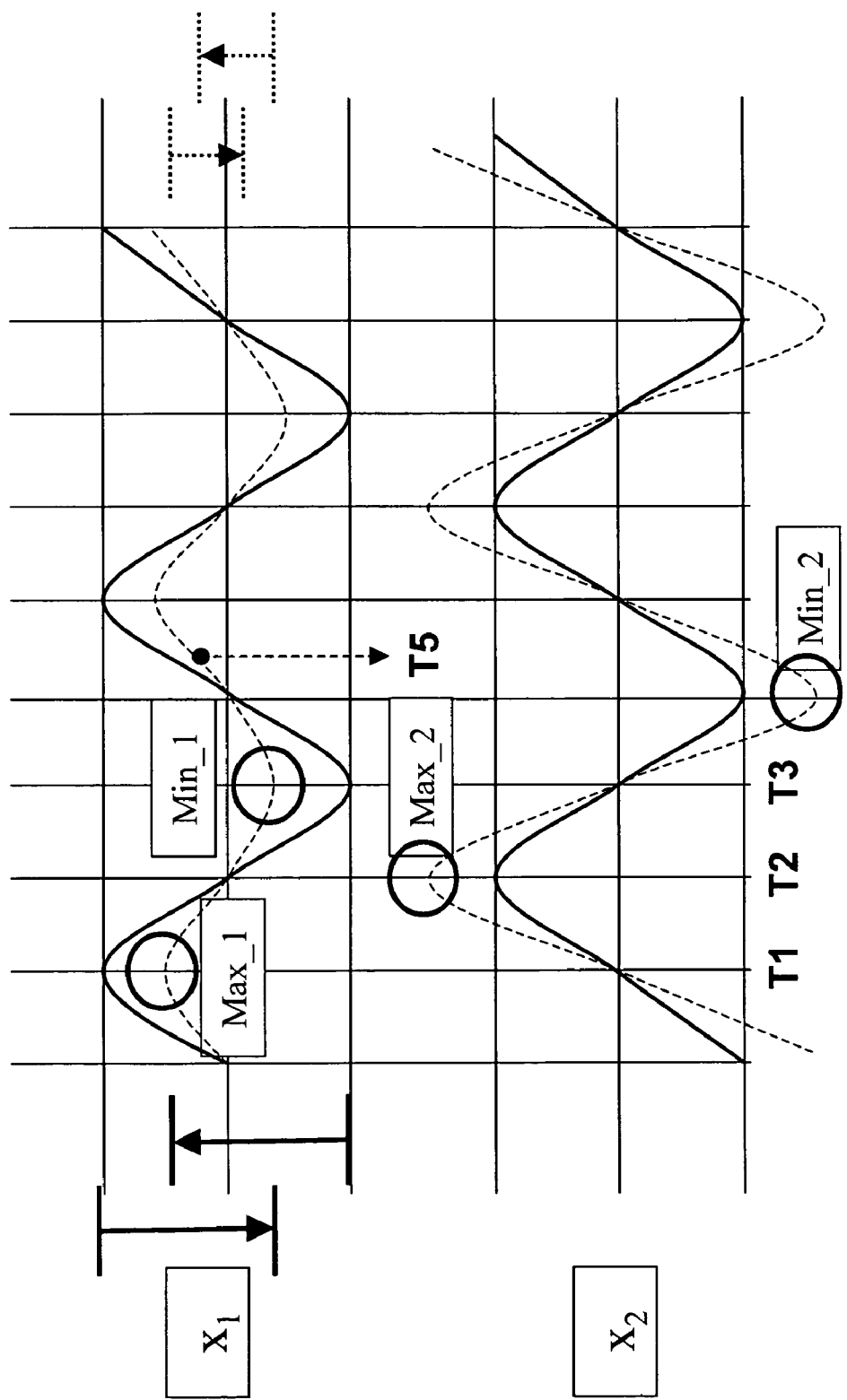
FIG. 7 explains how the present invention performs adaptive threshold update.

Referring to FIG. 7, the original signals in the two channels are as shown by the solid lines in the figure, but due to certain reasons, the received signals to be subject to calculation based on bumping algorithm are as shown by the dash lines. According to the present invention, the bumping threshold may be correspondingly modified. For example, if the peak amplitude in the first channel x1 at the time point T1 is Max_1, and the valley amplitude in the first channel x1 at the time point T3 is Min_1, then the bumping threshold Th1 in the first channel may be set as $$Th1=(\text{Max\_1}-\text{Min\_1})/C$$

wherein C is a constant such as 1.95, 1.90, 1.85, . . . , or a function dependent on the peak value or valley value, such as $$C=1.95 \text{ when Max\_1}-\text{Min\_1} \geq K$$

$$C=1.85 \text{ when Max\_1}-\text{Min\_1} < K$$

etc.

Furthermore, to prevent from updating the bumping threshold due to minor vibrations, or updating the bumping threshold due to an abnormally huge vibration caused by a noise, preferably, an upper limit and a lower limit may be given:

$$Th\_LB \leq Th1 \leq Th\_UB$$

Thus, the complete definition of the bumping threshold may be defined as follows:

$$Th1=Th\_LB \text{ when } Th1 \leq Th\_LB$$

$$Th1=(\text{Max\_1}-\text{Min\_1})/C \text{ when } Th\_LB \leq Th1 \leq Th\_UB$$

$$Th1=Th\_UB \text{ when } Th1 \geq Th\_UB$$

In FIG. 7, the original bumping threshold of the first channel is shown as the solid line at the left side of the figure, while the updated bumping threshold after the time point T3 is shown as the dash line at the right side of the figure. As shown in the figure, the first channel signal reaches the bumping threshold at the time point T5 and changes its state; however, if the adaptive threshold update step is not taken, the first channel signal will never reach the bumping threshold, causing severe errors in the follow-up calculation and estimation.

Likely, the bumping threshold Th2 of the second channel may be updated according to the peak amplitude Max_2 at the time point T2 and the valley amplitude Min_2 at the time point T4, as follows:

$$Th2=Th\_LB \text{ when } Th2 \leq Th\_LB$$

$$Th2=(\text{Max\_2}-\text{Min\_2})/C \text{ when } Th\_LB \leq Th2 < Th\_UB$$

$$Th2=Th\_UB \text{ when } Th2 \geq Th\_UB$$

V. Error Displacement Correction

Figure 8:
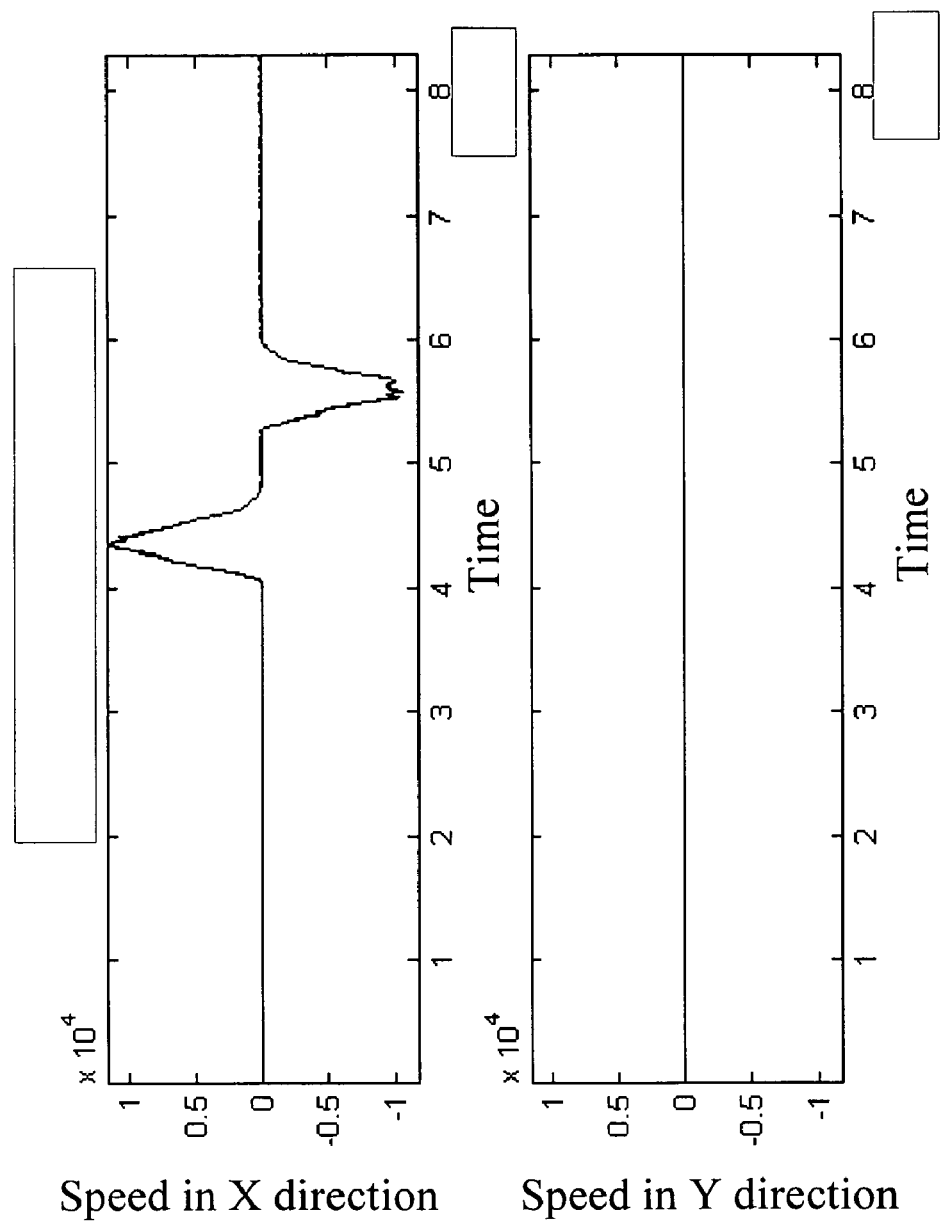
FIG. 8 shows a time-speed chart, by taking mouse movement as an example.
Figure 9:
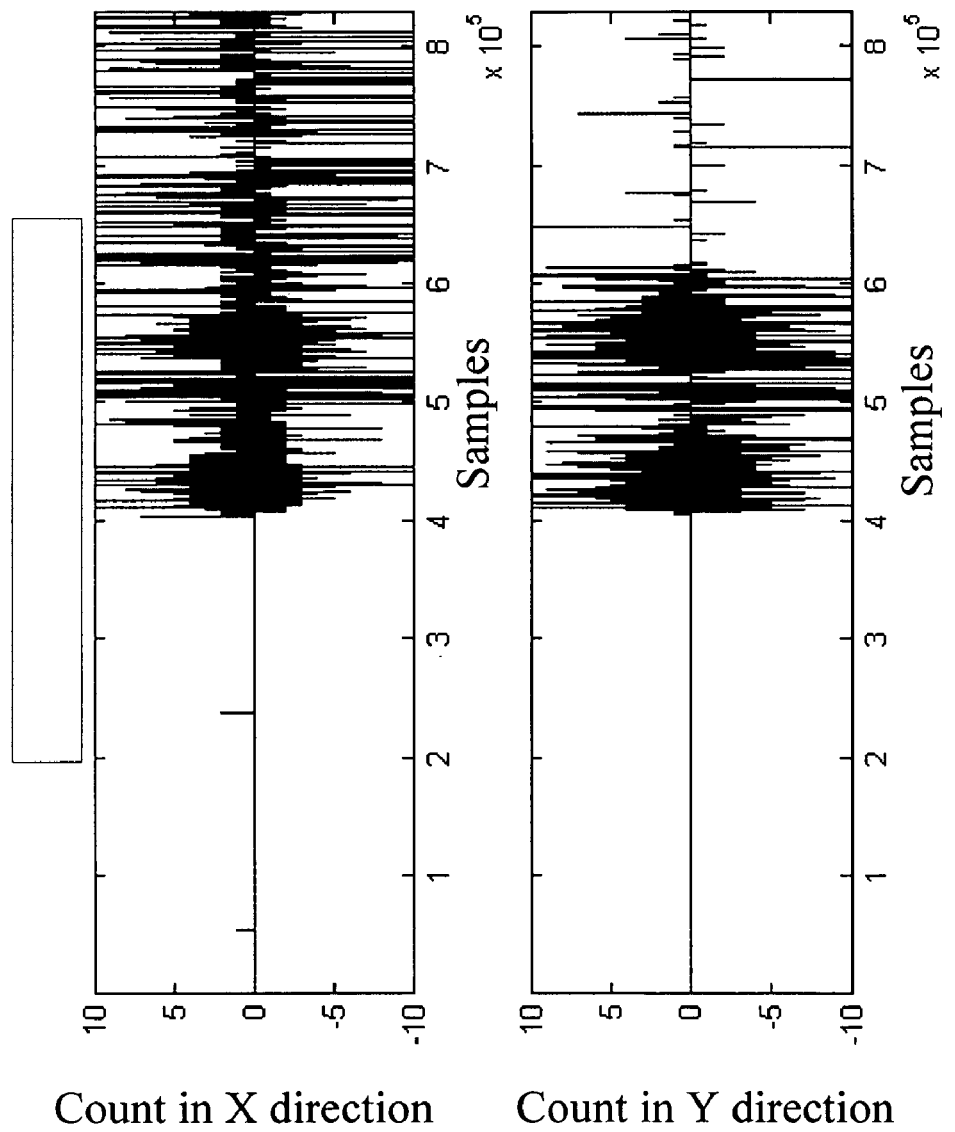
FIG. 9 shows the calculation result of the mouse movement of FIG. 8, which is based on the improved bumping algorithm but is not subject to displacement correction.

Referring to FIG. 8 which shows an example where the displacement estimation device and method according to the present invention is employed in an optical mouse, if the mouse moves first rightward and next leftward at the x-axis of an x-y two dimensional surface, the speed variation should be as shown. However, after subject to calculation based on bumping algorithm, due to noises in the optical signal, the actual relation between the sample number and the count number is as shown in FIG. 9, which does not accurately reflect the actual mouse movement. Hence preferably, according to the present invention, an error displacement correction step S4 may be provided after the filtering step S2, the consistency check step S31, the period prediction and compensation step S32, and the adaptive threshold update step S33 (or, as mentioned before, the step S2 may be neglected, and the steps S31-S33 may be selectively provided).

In the error displacement correction step, according to one embodiment of the present invention, a determination as to whether the displacement is reasonable or not may be made based on acceleration. When the displacement is not reasonable, the displacement may be neglected, or instead, the displacement estimation device may output a displacement behavior according to that in a previous period (period prediction and compensation).

In detail, in an application where the displacement estimation device and method according to the present invention is employed, there must be a limitation to the variation of the speed (the acceleration). To explain it, assuming the application is an optical mouse, when one holds a mouse and moves it very fast along one direction, it is impossible for the mouse to suddenly change its direction in an instant. Similarly, it is impossible for it to accelerate beyond a limit. Thus, when the calculation result in the previous steps includes such impossible movements, the error displacement correction step may help to filter them out.

The error displacement correction step is more detailedly explained below. According to Newton's law, $$v=v_0+a \times t$$

and assuming $v_0$ is 0, then $t=v/a$. If a is defined as the acceleration limit such as 8 g according to mouse sensitivity, then the sampling time interval may be determined: $t_{sample}=v/8 \text{ g}$;

during the interval, the moving direction can not be changed. The sampling number in a given time period T is $T/t_{sample}$.

As stated in the foregoing, the displacement amount may be calculated from the state change count (Count), and therefore the displacement amount is a function of Count; Count is a function of time. By moving average, the average velocity at a time point t may be calculated by:

$$\overline{v}_t = C_1 \times \text{count}(t) + C_2 \times \overline{v}_{t-1}$$

wherein $\overline{v}_t$ and $\overline{v}_{t-1}$ are, respectively, the average velocities at the time points t and t−1; count(t) is the count from the time point t−1 to the time point t; and $C_1$ and $C_2$ are weightings (because the count is obtained from samples, the total should be obtained from the count times a weighting).

More specifically, the weightings may be assigned as:

$$\overline{v}_t = \frac{w \times \text{count}(t) + (N - w) \times \overline{v}_{t-1}}{N}$$

That is, $C_1$=w/N, while $C_2$=(N−w)/N, wherein w is the assigned weighting, and N is a number given by the designer.

After the average velocity is obtained, when the average velocity $\overline{v}_t$ is larger than a positive threshold $v_p$, it means that within a time period $T_p=\overline{v}_t/a$ (a is the acceleration limit, such as 8 g), the displacement should be positive. In other words, within a time period $T_p<\overline{v}_t/a$, it is impossible for negative displacements to occur, so any negative displacement can be neglected.

When the average velocity $\overline{v}_t$ is smaller than a negative threshold $v_n$, it means that within a time period $T_n=v_t/a$, the displacement should be negative. likely, within a time period $T_n<-\overline{v}_t/a$, it is impossible for positive displacements to occur, so any positive displacement can be neglected.

Figure 10:
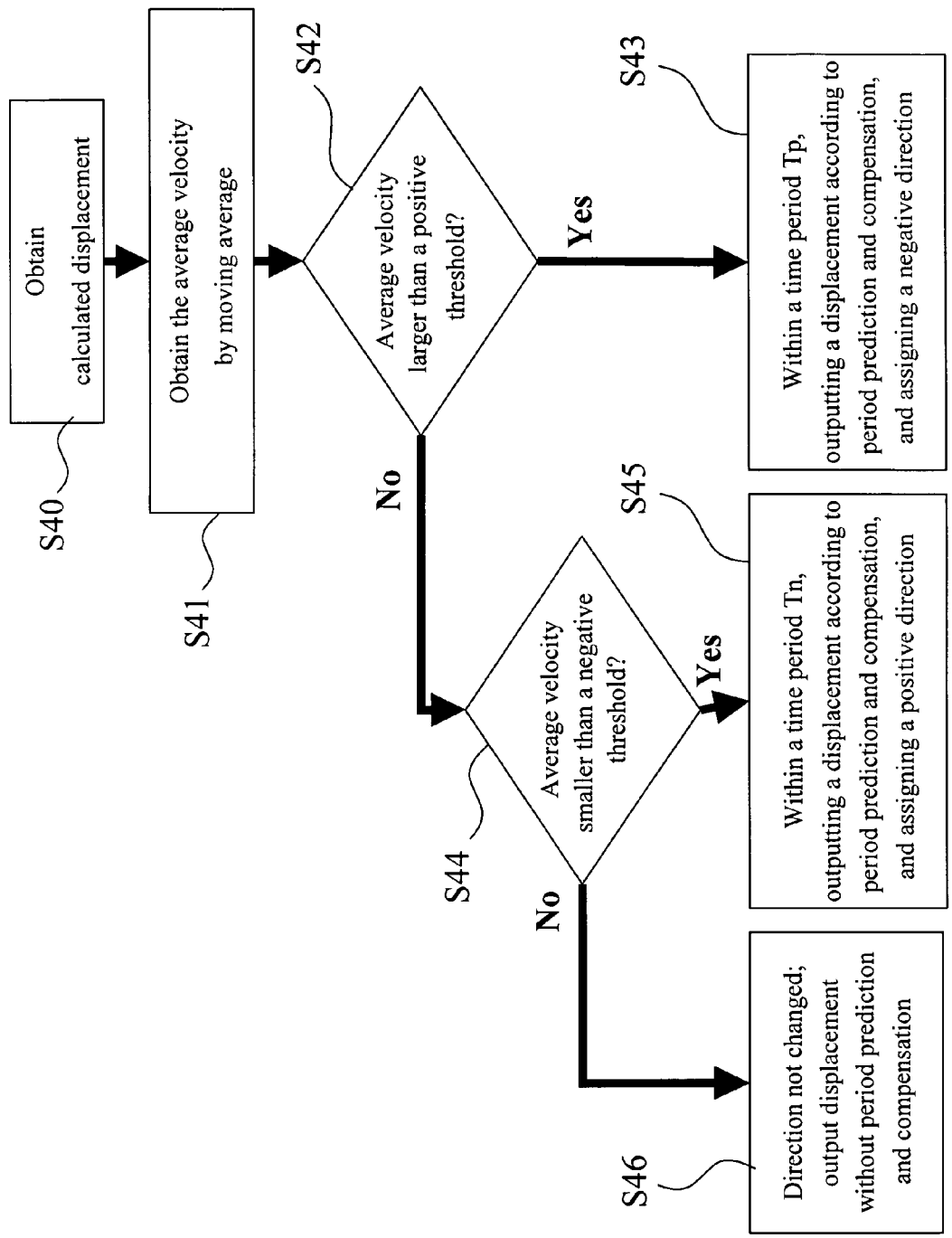
FIG. 10 is a flowchart showing the error displacement correction according to an embodiment of the present invention.

As a preferred embodiment, the error displacement correction step described above may be summarized as the flowchart shown in FIG. 10:

In the step S40, a calculation result of displacement is obtained from previous steps.

In the step S41, the average velocity $\overline{v}_t$ is obtained by moving average.

In the step S42, determination is made as to whether the average velocity $\overline{v}_t$ is larger than a positive threshold. If yes, the process goes to the step S43, wherein in the time period $T_p$, the device outputs displacement amounts based on period prediction and compensation, and the displacement direction is positive, regardless what the displacement direction is according to the calculation result obtained in the step S40.

If the determination result is "no" in the step S42, the process goes to the step S44, wherein determination is made as to whether the average velocity $\overline{v}_t$ is smaller than a negative threshold. If yes, the process goes to the step S45, wherein in the time period $T_n$, the device outputs displacement amounts based on period prediction and compensation, and the displacement direction is negative, regardless what the displacement direction is according to the calculation result obtained in the step S40.

If the determination result is "no" in the step S44, the process goes to the step S46, wherein the displacement direction is not changed and no period prediction and compensation is made; the calculation result obtained in the step S40 is outputted directly.

In the foregoing description, "outputting displacement amounts based on period prediction and compensation" is to proportionally output displacement amounts in the present time period according to that in the previous time period; please refer to III. PERIOD PREDICTION AND COMPENSATION for the details thereof.

Figure 11:
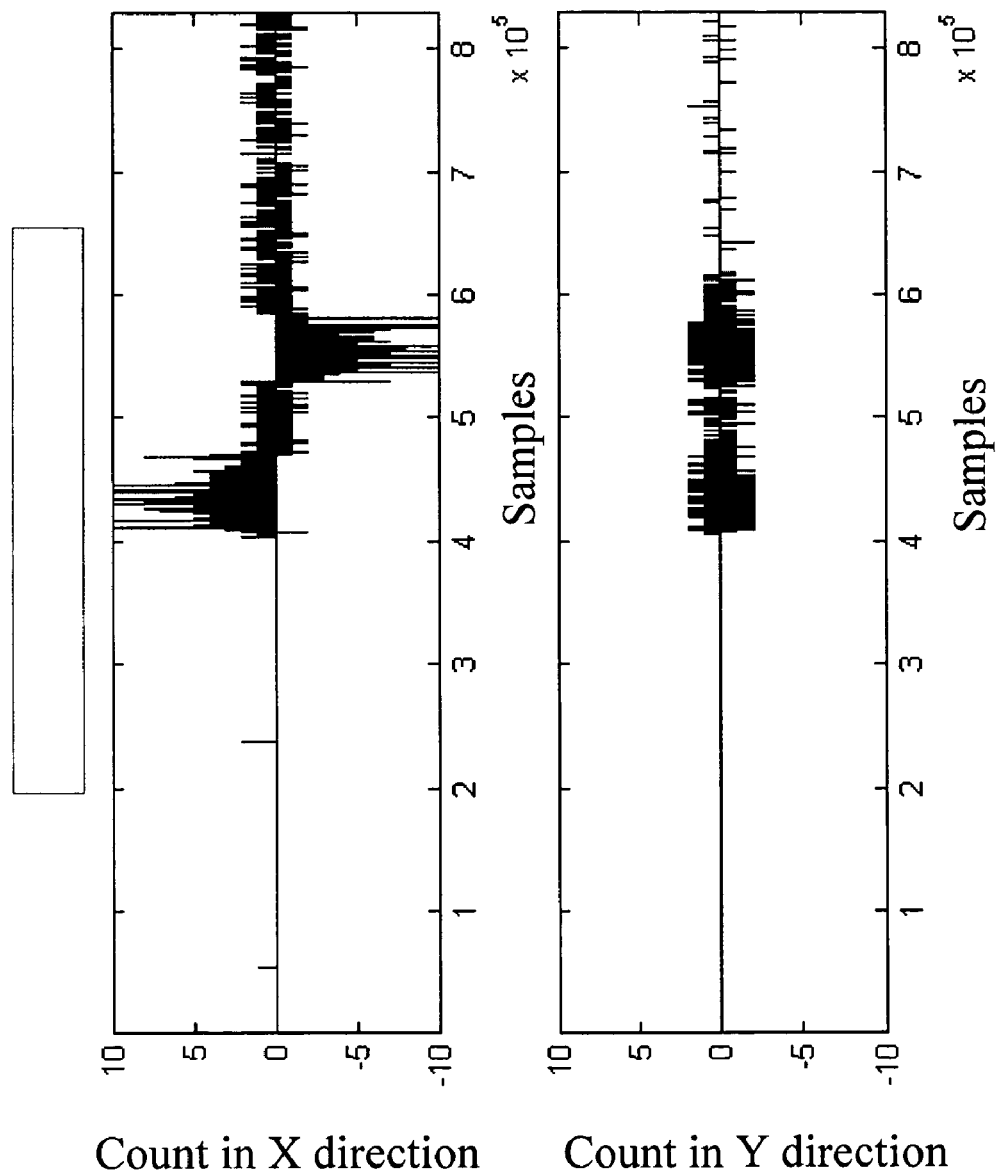
FIG. 11 shows the calculation result of the mouse movement of FIG. 8, which is based on the improved bumping algorithm and also subject to error displacement correction.

What is shown in FIG. 9, after correction by the error displacement correction step S4, is as shown in FIG. 11. Comparison between the two figures clearly shows that FIG. 11 is more accurate than FIG. 9.

Figure 12:
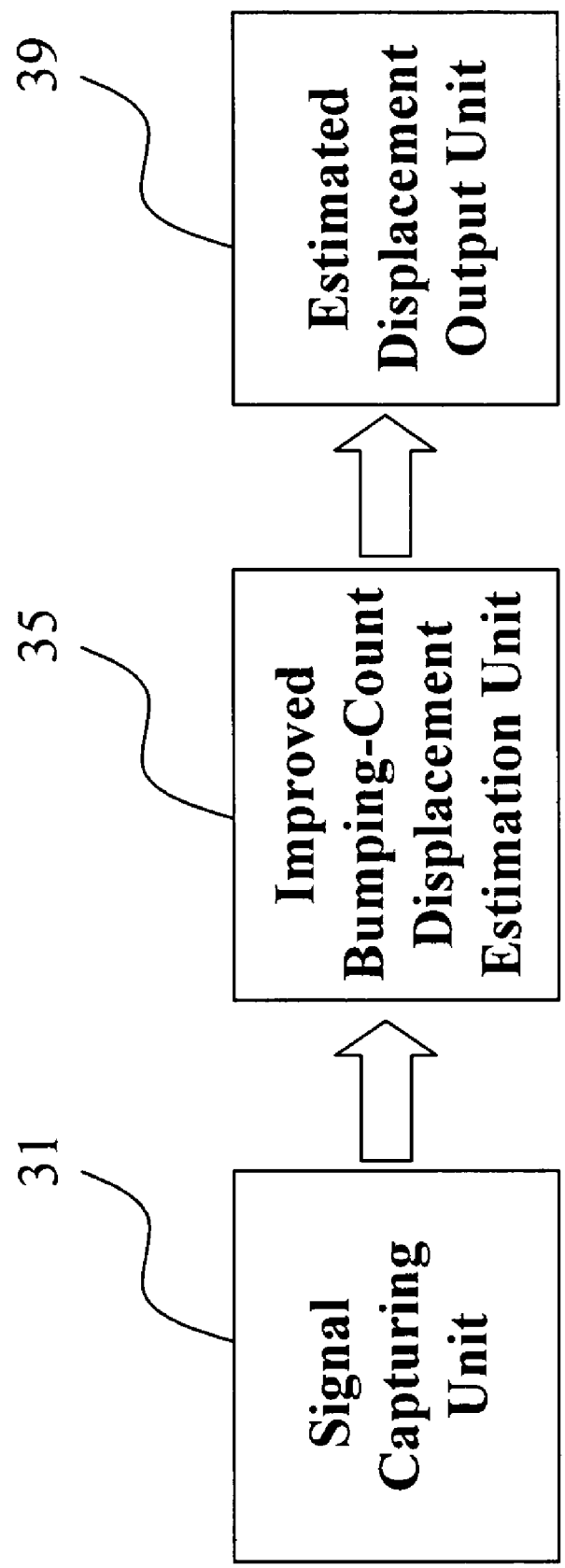
FIG. 12 schematically shows a displacement estimation device according to an embodiment of the present invention.

The bumping algorithm and the displacement estimation method according to the present invention have been explained above. An embodiment of the displacement estimation device employing the method according to the present invention is shown in FIG. 12, which includes a signal capturing unit 31, which captures a signal and sends it to an improved bumping-count displacement estimation unit 35 according to the present invention. This unit 35, besides estimating the displacement according to the phase difference between the received signals and the bumping count, modifies the count by one or more of the steps of consistency check, period prediction and compensation, and adaptive threshold update. The estimated displacement is outputted by an estimated displacement output unit 39.

Figure 13:
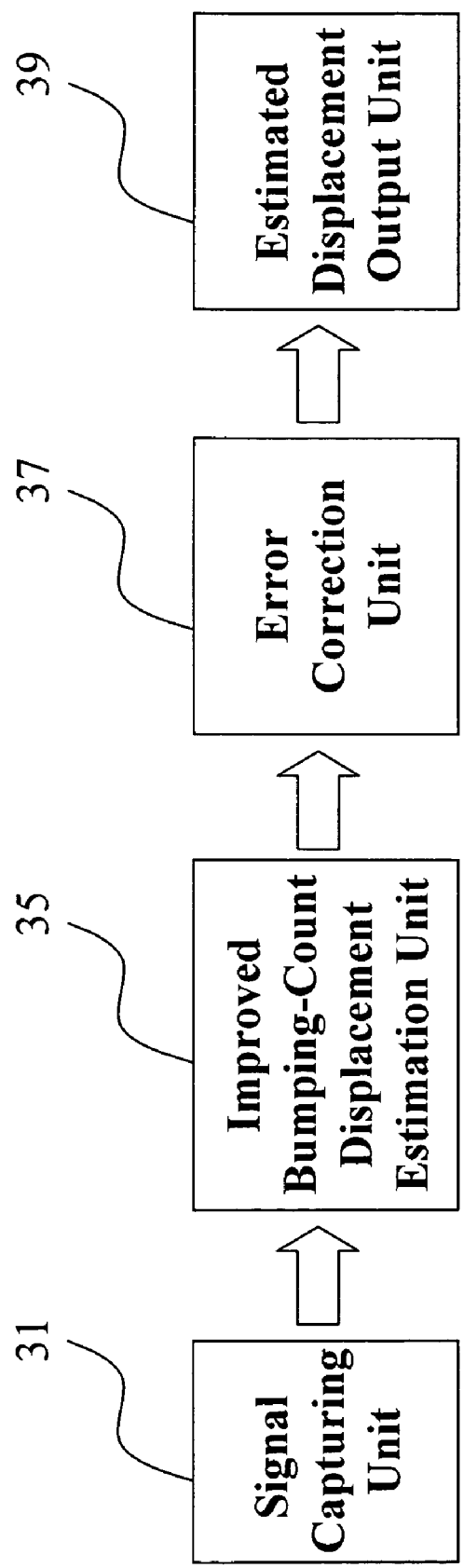
FIG. 13 schematically shows a displacement estimation device according to another embodiment of the present invention.

Furthermore, another embodiment of the displacement estimation device is shown in FIG. 13, which includes a signal capturing unit 31, an improved bumping-count displacement estimation unit 35, an error displacement correction unit 37, and an estimated displacement output unit 39, in which the improved bumping-count displacement estimation unit 35 may be replaced by the conventional an bumping-count displacement estimation unit 15, i.e., none of the steps of consistency check, period prediction and compensation, and adaptive threshold update is taken. The output of the improved bumping-count displacement estimation unit 35 or the bumping-count displacement estimation unit 15 passes through the error displacement correction unit 37 to perform an correction based on the process flow described in FIG. 10, and the corrected result is outputted.

Figure 14:
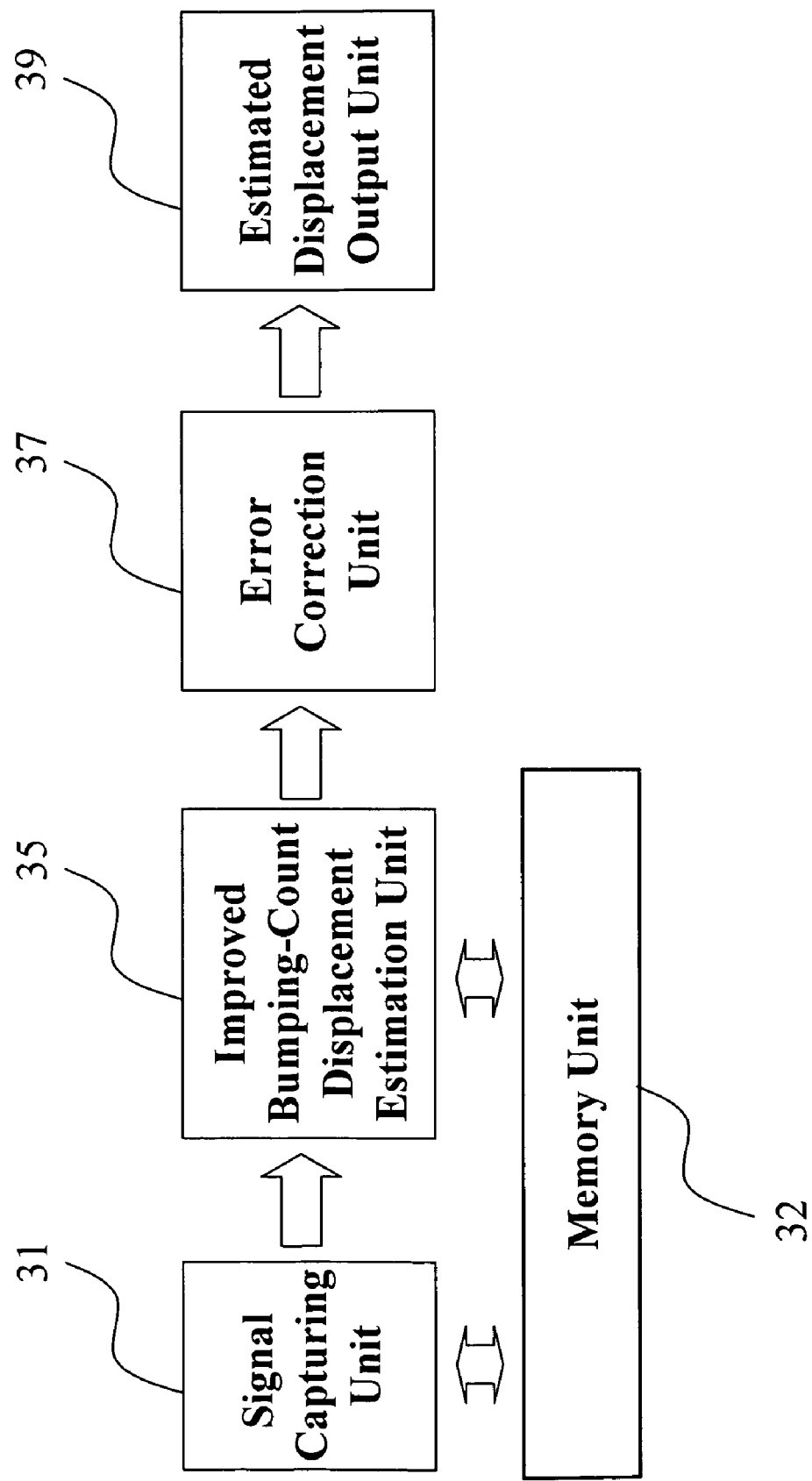
FIG. 14 schematically shows a displacement estimation device according to a further other embodiment of the present invention.

Moreover, another embodiment of the displacement estimation device is shown in FIG. 14, which includes a signal capturing unit 31, a signal enhancement unit 33, an improved bumping-count displacement estimation unit 35, and an estimated displacement output unit 39. To support calculation for band-pass filtering or adaptive filtering, a memory unit 32 may be optionally provided to store the signal, and the signal is sent to the improved bumping-count displacement estimation unit 35 after being processed by the signal enhancement unit 33. The data such as the peak value, valley value, length of a period, etc. that are required for the calculation performed in the improved bumping-count displacement estimation unit 35 for processing the consistency check, the period prediction and compensation, or the adaptive threshold update, may also be stored in this memory unit 32. Or, such data may be stored in a built-in memory (not shown) in the improved bumping-count displacement estimation unit 35, to speed up operation speed.

Figure 15:
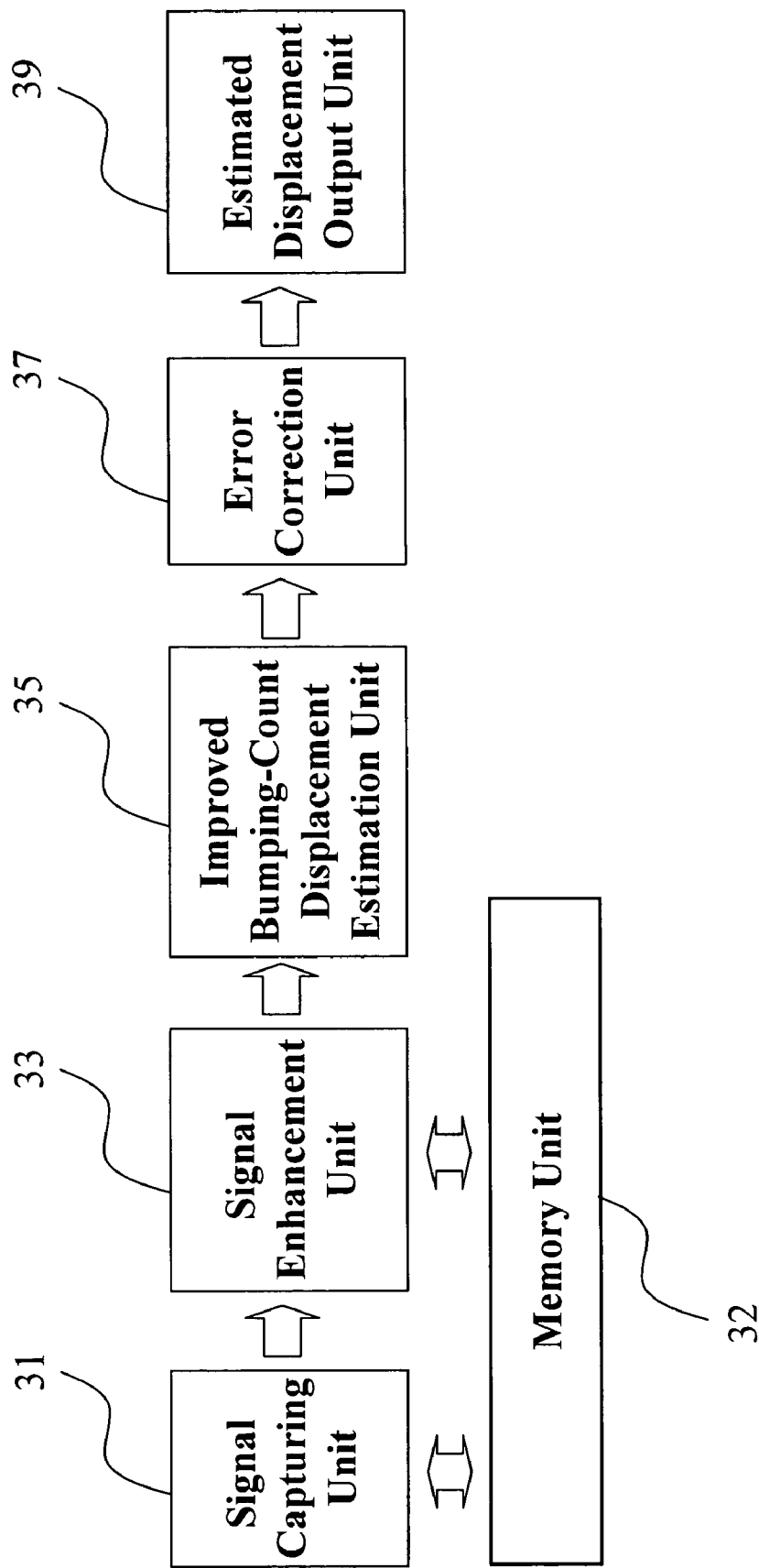
FIG. 15 schematically shows a displacement estimation device according to a still further other embodiment of the present invention.

Of course, the embodiment shown in FIG. 14 may be further provided with the error displacement correction unit 37 to correct the final result, as shown in FIG. 15.

As a practical application, the displacement estimation device according to the present invention may be electrically connected with an image capturing device (not shown) in an optical mouse, to calculate the movement speed and direction of the mouse relative to the surface of a desk, and to control the movement of a cursor on a computer screen based on the speed and direction.

It should be noted that in addition to the optical mouse, the displacement estimation device according to the present invention may be applied to other optical pointing devices for controlling the movement of a cursor on the screen, or even applied to any apparatuses that requires tracing the positional changes of images. For example, the displacement estimation device according to the present invention may be installed in an automobile having the capability of capturing images, for determining whether the automobile deflects from a driving lane. Or, the displacement estimation device according to the present invention may be applied to a navigation system, or to a speeding detector, wherein the displacement of an automobile calculated by the displacement estimation device is divided by the time difference between two images to obtain the speed of the automobile.

The features, characteristics and effects of the present invention have been described with reference to its preferred embodiments, which are illustrative of the invention rather than limiting of the invention. Various other substitutions and modifications will occur to those skilled in the art, without departing from the spirit of the present invention. For example, what is shown in the figures as an independent circuit block may be combined with one or more other circuit blocks; a circuit block needs not necessarily stand alone. And, two circuit blocks that are shown directly connected with one another may be interposed with a third circuit block that does not affect the basic purpose of the original circuit structure, such as a delay gate. As another example, the filtering to be performed in the signal enhancement unit is not limited to the methods described in the above. As another example, it is easier to perform the consistency check based on the peak and/or the valley, but the same purpose may be achieved by using a signal point that is within a distance from the peak and/or the valley. As another example, to determine whether a calculated displacement is reasonable by moving average is only one preferred example; there are other equivalent alternatives. Therefore, all such substitutions and modifications are intended to be embraced within the scope of the invention as defined in the appended claims.

What is claimed is:

1. A displacement estimation device, comprising:
   a signal capturing unit for capturing a signal external to said device;
   a displacement estimation unit electrically connected with said signal capturing unit, wherein said displacement estimation unit calculates a displacement based on a state change in time-domain of said signal captured by said signal capturing unit; and
   a displacement output unit for outputting said displacement,
   characterized in that
   said displacement estimation unit performs one or more of the steps of:
   (A) consistency check to determine whether said state change of said signal is consistent with the waveform of said signal;
   (B) period prediction and compensation to count in the present period according to a proportional length of a previous period; and
   (C) adaptive threshold update to adjust the definition of said state change corresponding to the amplitude of said signal.

2. The displacement estimation device according to claim 1, further comprising a signal enhancement unit electrically connected between said signal capturing unit and said displacement estimation unit for selecting a meaningful portion of said signal.

3. The displacement estimation device according to claim 2, further comprising a memory unit electrically connected with said signal enhancement unit for storing said signal.

4. The displacement estimation device according to claim 2, wherein said signal enhancement unit filters said signal by one selected from the following methods: band-pass filtering, least-mean-square adaptive filtering, normalized least-mean-square adaptive filtering, or Kalman adaptive filtering.

5. The displacement estimation device according to claim 1, further comprising an error displacement correction unit electrically connected between said displacement estimation unit and said displacement output unit for correcting the result produced by said displacement estimation unit.

6. The displacement estimation device according to claim 5, wherein said error displacement correction unit performs the steps of:
   (D1) obtaining an average velocity by moving average according to the output of said displacement output unit;
   (D2) determining whether said average velocity is larger than a predetermined positive threshold, and if yes, replacing the output of said displacement output unit by a displacement behavior in a previous period within a first time period, and assigning a positive direction;
   (D3) if the determination result is "no" is the step (D2), determining whether said average velocity is smaller than a predetermined negative threshold, and if yes, replacing the output of said displacement output unit by said displacement behavior in said previous period within a second time period, and assigning a negative direction;
   (D4) if the determination result is "no" is the step (D3), outputting the output of said displacement output unit.

7. The displacement estimation device according to claim 1, wherein said signal capturing unit captures two signals respectively at least two positions, and wherein the step (A) includes: when a state change of one signal captured at one position leads a state change of the other signal captured at the other position, checking whether a previous peak or valley of said one signal leads a previous peak or valley of said other signal.

8. The displacement estimation device according to claim 1, wherein the step (B) includes the steps of: proportionally projecting the length of said previous period in the present period; calculating a count of said proportionally projected length in the present period; and proportionally outputting a displacement behavior of said previous period according to the count.

9. The displacement estimation device according to claim 1, wherein said displacement estimation unit calculates a displacement based on bumping algorithm in which said signal captured by said signal capturing unit is deemed to change state when it reaches a bumping threshold, and a count of state changes is used to calculate said displacement.

10. A displacement estimation method, comprising:
    a signal capturing step for capturing a signal;
    a displacement estimation step for calculating a displacement based on a state change in time-domain of said signal; and
    an output step for outputting said displacement,
    characterized in that
    said displacement estimation step includes one or more of the steps of:
    (A) consistency check to determine whether said state change of said signal is consistent with the waveform of said signal;
    (B) period prediction and compensation to count in the present period according to a proportional length of a previous period; and (C) adaptive threshold update to adjust the definition of said state change corresponding to the amplitude of said signal.

11. The displacement estimation method according to claim 10, further comprising a signal enhancement step for selecting a meaningful portion of said signal.

12. The displacement estimation method according to claim 11, wherein said signal enhancement step filters said signal by one selected from the following methods: band-pass filtering, least-mean-square adaptive filtering, normalized least-mean-square adaptive filtering, or Kalman adaptive filtering.

13. The displacement estimation method according to claim 10, further comprising an error displacement correction step for correcting said displacement.

14. The displacement estimation method according to claim 13, wherein said error displacement correction step includes the steps of:
(D1) obtaining an average velocity by moving average according to the output of said displacement output unit;
(D2) determining whether said average velocity is larger than a predetermined positive threshold, and if yes, replacing the output of said displacement output unit by a displacement behavior in a previous period within a first time period, and assigning a positive direction;
(D3) if the determination result is "no" is the step (D2), determining whether said average velocity is smaller than a predetermined negative threshold, and if yes, replacing the output of said displacement output unit by said displacement behavior in said previous period within a second time period, and assigning a negative direction;
(D4) if the determination result is "no" is the step (D3), outputting the output of said displacement output unit.

15. The displacement estimation method according to claim 14, wherein said first time period and said second time period are determined by: dividing an absolute value of said average velocity by a predetermined acceleration limit.

16. The displacement estimation method according to claim 10, wherein said signal capturing step includes: capturing two signals respectively at least two positions, and wherein the step (A) includes: when a state change of one signal captured at one position leads a state change of the other signal captured at the other position, checking whether a previous peak or valley of said one signal leads a previous peak or valley of said other signal.

17. The displacement estimation method according to claim 10, wherein the step (B) includes the steps of: proportionally projecting the length of said previous period in the present period; calculating a count of said proportionally projected length in the present period; and proportionally outputting a displacement behavior of said previous period according to the count.

18. The displacement estimation method according to claim 10, wherein said displacement estimation step includes: calculating a displacement based on bumping algorithm in which said signal captured by said signal capturing unit is deemed to change state when it reaches a bumping threshold, and a count of state changes is used to calculate said displacement.

19. A method for estimation of signal frequency based on bumping algorithm, comprising:
receiving a signal;
determining an amplitude value as a bumping threshold;
counting the number of state changes in time-domain, wherein a state change occurs when said signal reaches said bumping threshold from a peak, or from a valley;
characterized by further comprising one or more of the steps of:
(A) consistency check to determine whether said state change of said signal is consistent with the waveform of said signal;
(B) period prediction and compensation to count in the present period according to a proportional length of a previous period; and
(C) adaptive threshold update to adjust the definition of said state change corresponding to the amplitude of said signal.

20. A displacement estimation device comprising:
a signal capturing unit for capturing a signal external to said device;
a displacement estimation unit electrically connected with said signal capturing unit, wherein said displacement estimation unit calculates a displacement based on a state change in time-domain of said signal captured by said signal capturing unit;
an error displacement correction unit electrically connected with said displacement estimation unit, for correcting the result generated by said displacement estimation unit; and
a displacement output unit electrically connected with error displacement correction unit for outputting the corrected result generated by said error displacement correction unit.

* * * * *